(12) United States Patent
Sato (10) Patent No.: US 7,706,098 B2
(45) Date of Patent: Apr. 27, 2010

(54) DISK DRIVE IN WHICH THE DYNAMIC FLYING HEIGHT OF HEAD IS ADJUSTED

(75) Inventor: Takumi Sato, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/395,371

(22) Filed: Feb. 27, 2009

(65) Prior Publication Data

US 2010/0002328 A1    Jan. 7, 2010

(30) Foreign Application Priority Data

Jul. 2, 2008    (JP) ............................... 2008-173866

(51) Int. Cl.
*G11B 21/02*    (2006.01)
*G11B 33/14*    (2006.01)

(52) U.S. Cl. ...................... 360/75; 360/97.02

(58) Field of Classification Search ................. None
See application file for complete search history.

(56) References Cited

U.S. PATENT DOCUMENTS 6,151,183 A    11/2000    Ogasawara et al.

6,693,761 B2 *    2/2004    Ishii et al. ...................... 360/75

FOREIGN PATENT DOCUMENTS

| JP | H06-150522 A | 5/1994 |
|---|---|---|
| JP | H09-063220 A | 3/1997 |
| JP | H10-334626 A | 12/1998 |
| JP | 2004-14092 A | 1/2004 |
| JP | 2006-226136 A | 8/2006 |
| JP | 2007-273024 A | 10/2007 |
| JP | 2007-310957 A | 11/2007 |

OTHER PUBLICATIONS

Explanation of Non-English Language References.

* cited by examiner

*Primary Examiner*—K. Wong
(74) *Attorney, Agent, or Firm*—Knobbe, Martens, Olson & Bear LLP (57) ABSTRACT

According to one embodiment, an adjusting element adjusts a dynamic flying height of a head lying over a disk in accordance with the power supplied to it. A calculation module calculates the power to supply to the adjusting element, from a barometric pressure detected by a barometric pressure sensor. A failure detection module detects failure of the barometric pressure sensor. An unload controller predicts an abnormal dynamic flying height of the head from the failure detected and then instructs the unloading of the head away from the disk.

15 Claims, 5 Drawing Sheets

DISK DRIVE IN WHICH THE DYNAMIC FLYING HEIGHT OF HEAD IS ADJUSTED

CROSS-REFERENCE TO RELATED APPLICATIONS

This application is based upon and claims the benefit of priority from Japanese Patent Application No. 2008-173866, filed Jul. 2, 2008, the entire contents of which are incorporated herein by reference.

BACKGROUND

1. Field

One embodiment of the invention relates to a disk drive in which the dynamic flying height of the head can be adjusted by supplying to the head the power calculated from the barometric pressure detected by, for example, a barometric pressure sensor.

2. Description of the Related Art

Disk drives (e.g., magnetic disk drives) having an actuator that can adjust the dynamic flying height (DFH) of the head have been hitherto known. The actuator has a slider (magnetic head slider) that holds the head (magnetic head). The actuator supports the slider and can move the slider radially over the disk (magnetic disk). As generally defined, the dynamic flying height of the head is the distance between the head and the disk (more precisely, the surface of the disk, i.e., disk surface).

Known as actuators capable of adjusting the dynamic flying height of the head are thermal actuators, piezoelectric actuators, and the like. Such an actuator can adjust the dynamic flying height of the head as its part is deformed. The thermal actuator, for example, has its slider deformed through thermal expansion. Used as a heat source (adjusting element) that achieves the thermal expansion is a heater (resistive heating element). The heater is arranged at that part of the slider which lies near the head. In the thermal actuator, the power supplied to the heater is controlled, varying the thermal expansion of the slider (head). The dynamic flying height of the head is thereby adjusted. As described in, for example, Jpn. Pat. Appln. KOKAI Publication No. 2004-014092, the dynamic flying height of the head is measured (or estimated) from the harmonic wave ratio of a signal reproduced by the head.

The piezoelectric actuator has a slider, a suspension and a piezoelectric element. The suspension supports the slider. The piezoelectric element is arranged on the slider (or on the suspension). A voltage is applied to the piezoelectric element, adjusting the deformation of the slider. The dynamic flying height of the head is thereby adjusted. That is, the piezoelectric actuator uses a piezoelectric element as an element (adjusting element) for adjusting the dynamic flying height of the head.

The dynamic flying height of the head changes with the barometric pressure (ambient barometric pressure) in the environment where the disk drive is used, as is described in, for example, Jpn. Pat. Appln. Publication No. 09-063220, Jpn. Pat. Appln. Publication No. 06-150522, Jpn. Pat. Appln. Publication No. 10-334626 and Jpn. Pat. Appln. Publication No. 2007-310957. More precisely, the higher the ambient barometric pressure, the higher the dynamic flying height of the head will be. Conversely, the lower the ambient barometric pressure, the lower the dynamic flying height of the head will be. In this way, if the dynamic flying height of the head changes in response to a change in the ambient barometric pressure, the head may not be able to stably write or read data with reference to a disk.

In view of this, such a technique (prior art)s disclosed in, for example, Jpn. Pat. Appln. Publication No. 09-063220 is used to maintain the dynamic flying height of the head always at a target value, not influenced by the ambient barometric pressure. In this prior art, a barometric pressure sensor measures the pressure ambient to the disk drive, and the power (i.e., voltage or current) supplied to the adjusting element of the actuator is controlled in accordance with the pressure thus measured. The dynamic flying height of the head can therefore be maintained at the target value.

With the prior art described above, however, the dynamic flying height of the head can hardly be maintained at the target value if the barometric pressure sensor fails to operate well. In particular, if the barometric pressure detected by the barometric pressure sensor is higher than the actual value, the head may be set at a dynamic flying height much smaller than the target value, as will be explained below.

If the barometric pressure detected by the barometric pressure sensor is higher than the actual value, the dynamic flying height of the head will be estimated greater than the target value. In this case, the power supplied to the adjusting element is increased over the value of the correct power that should be supplied to the adjusting element. Although the actual barometric pressure is lower than the pressure detected by the barometric pressure sensor, more power than necessary is supplied to the adjusting element. Therefore, the actual dynamic flying height of the head may be unusually set at a very low value compared to the target dynamic flying height. If the head has such a low dynamic flying height, it may contact the disk (disk medium) spinning at high speed. Consequently, the head may fail to function, or the disk (medium) may be damaged.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, a disk drive is provided. The disk drive comprises: an adjusting element configured to adjust a dynamic flying height of a head lying over a disk, in accordance with power supplied; a calculation module configured to calculate the power to supply to the adjusting element, from a barometric pressure detected by a barometric pressure sensor; a failure detection module configured to detect failure of the barometric pressure sensor; and an unload controller configured to instruct unloading of the head from the disk, upon predicting an abnormal dynamic flying height of the head from the failure of the barometric pressure sensor.

Figure 1:
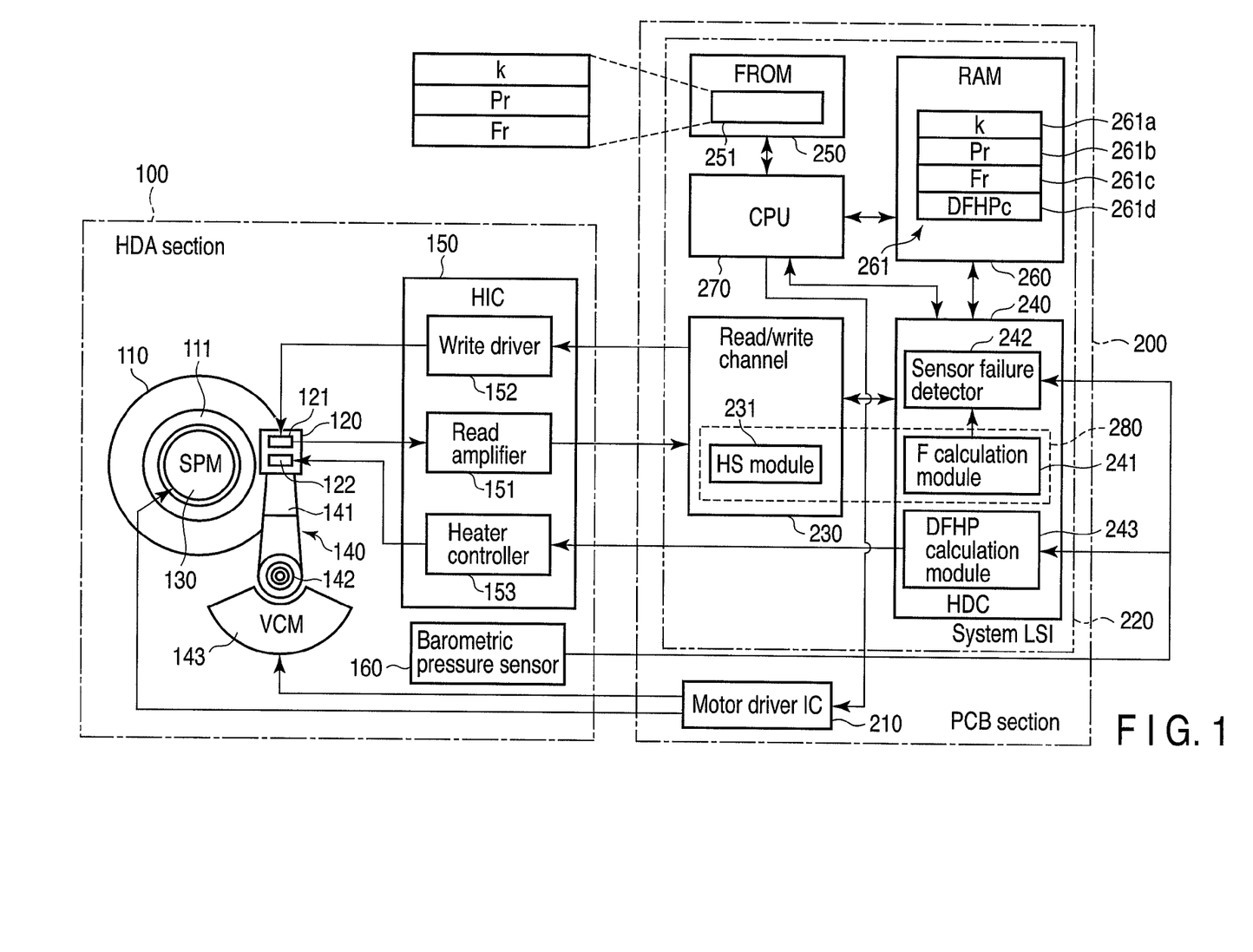
FIG. 1 is a block diagram showing an exemplary configuration a disk drive (HDD) according to an embodiment of the invention may have.

FIG. 1 is a block diagram showing an exemplary configuration a disk drive according to an embodiment of the invention may have. The disk drive is, for example, a hard disk drive (HDD). The HDD comprises two main sections, i.e., a head-disk assembly (HDA) section 100 and a printed circuit board (PCB) section 200.

The HDA section 100 is the main section of the HDD and has a disk (magnetic disk) 110, a spindle motor (SPM) 130, an actuator 140, a head IC (HIC) 150, and a barometric pressure sensor 160. The disk 110 has two disk surfaces, i.e., upper and lower disk surfaces. At least one disk surface (e.g., upper disk surface) defines a recording surface in which data may be recorded. On the recording surface, a number of concentric tracks (not shown) are arranged. Of these tracks, a predetermined number of inner tracks constitute an area allocated as a system area 111, which is dedicated to the system only. The spindle motor (SPM) 130 can rotate the disk 110 at high speed.

The actuator 140 has a slider (magnetic-head slider) 120. The slider 120 is arranged over the recording surface of the disk 110. As the disk 110 is rotated, the slider 120 flies above the disk 110. The slider 120 includes a head (magnetic head) 121 and a heater 122. The head 121 is a composite head that has a read-head element and a write-head element. The head 121 is used to write data in, and read data from, the disk 110.

The heater 122 is a resistive heating element. When supplied with power (current), the heater 122 generates heat. The heat thus generated thermally expands a part of the slider 120 (i.e., head 121). That is, the heater 122 is the element that adjusts the distance between the head 121 and the recording surface of the disk 110, i.e., the dynamic flying height of the head 121.

The actuator 140 is a thermal actuator. The actuator 140 has a suspension arm 141, a pivot 142, and a voice coil motor (VCM) 143, in addition to the slider 120. The suspension arm 141 supports the slider 120. The pivot 142 supports the suspension arm 141, allowing the arm 141 to rotate freely. The VCM 143 is a drive source for the actuator 140. The VCM 143 exerts a torque on the suspension arm 141 so that the slider 120 may move radially over the disk 110. When the slider 120 is so moved, the head 121 is positioned at the target track of the disk 110.

The SPM 130 and the VCM 143 are driven with drive currents (i.e., SPM current and VCM current) supplied from a motor driver IC 210, which will be described later. The head 121 and heater 122 are connected to the HIC 150. The HIC 150 is secured to, for example, a predetermined part of the actuator 140 and is electrically connected to the printed circuit board (PCB) section 200 by a flexible printed circuit (FPC). In FIG. 1, however, the HIC 150 is arranged remote from the actuator 140, for convenience of illustration. The HIC 150 may be secured to the PCB section 200, nevertheless.

The HIC 150 is a one-chip IC that includes a read amplifier 151, a write driver 152, and a heater controller 153. The read amplifier 151 amplifies any signal (read signal) that the head 121 has read. The write driver 152 receives a write signal from a read/write channel 230 (more precisely, write channel 232 incorporated in the channel 230), which will be described later, and converts the write signal to a current. This current is output to the head 121.

The heater controller 153 supplies to the heater 122 the power (hereinafter called DFH power) of a value designated by a CPU 270, which will be later described. In this embodiment, the value of the DFH power the heater controller 153 supplies to the heater 122 is designated by setting a parameter (DFH-power parameter) in the dedicated register (not shown) that is incorporated in the head IC 150. The parameter is set in the dedicate register by the CPU 270 via an HDC 240, which will be described later.

The barometric pressure sensor 160 detects the barometric pressure in the environment where the HDD is used. In this embodiment, the barometric pressure sensor 160 is provided in the HDA section 100. Nonetheless, it does not matter whether the barometric pressure sensor 160 is provided in the PCB section 200 or outside the HDA section 100 and PCB section 200.

The PCB section 200 comprises mainly two LSIs, i.e., a motor driver IC 210 and a system LSI 220. The motor driver 210 drives the SPM 130 and the VCM 143. More specifically, the motor driver IC 210 drives the SPM 130 at a constant speed. Further, the motor driver IC 210 supplies a current (VCM current) designated by the CPU 270 to the VCM 143, thus driving the actuator 140.

The system LSI 220 is an LSI called "system on chip (SOC)" that comprises a read/write channel 230, a disk controller (HDC) 240, a flash ROM (FROM) 250, a RAM 260, and a CPU 270, all integrated together in a single chip. The read/write channel 230 is a signal-processing device that processes signals related to read/write operation. The read/write channel 230 has a read channel 232 (later described in detail). The read channel 232 has a harmonic sensor module (HS module) 231. The HS module 231 will be described later. The read/write channel 230 is connected to the head IC 150 that is incorporated in the HDA section 100.

The HDC 240 is connected to a host (host system, the read/write channel 230, the RAM 260 and the CPU 270. The host uses the HDD as an external apparatus. The host is a digital apparatus such as a personal computer. The HDC 240 has host-interface control function of receiving commands (e.g., write command, read command, etc.) transferred from the host and transferring data between the host and the HDC 240. The HDC 240 also has disk-interface control function of transferring data between the disk 110 and the HDC 240 through the read/write channel 230.

The HDC 240 includes a dynamic flying height calculation module (F calculation module) 241, a sensor failure detector 242, and a DFH power calculation module (DFH calculation module) 243. The F calculation module 241, sensor failure detector 242 and DFH calculation module 243 will be described in terms of their functions.

The FROM 250 is a nonvolatile memory in which data can be rewritten and stores a control program (firmware program). Executing this control program, the CPU 270 controls the HDD. A part of the storage area of the FROM 250 is used as pressure-prediction parameter storage area 251. The pressure-prediction parameter storage area 251 is used to hold parameters (pressure-prediction parameters) k, Pr and Fr that are required for calculating the barometric pressure in the environment where the HDD of FIG. 1 is used.

Parameter k is a coefficient (proportionality constant) that represents the rate at which the dynamic flying height of the head 121 changes with the barometric pressure in the where the HDD of FIG. 1 is used. Hereinafter, parameter k will be called "coefficient k." Coefficient k is given as follows:

$$k = \Delta F / \Delta P \quad (1)$$

where ΔP is the change in the barometric pressure and ΔF is the value by which the dynamic flying height of the head 121 changes when the barometric pressure changes by ΔP.

That is, coefficient k represents the pressure-change dependency of the dynamic flying height of the head 121. Coefficient k has been acquired during the manufacture of the HDD.

Parameter Pr represents a reference barometric pressure. Hereinafter, parameter Pr will be called "reference barometric pressure Pr." In this embodiment, reference barometric pressure Pr is the atmospheric pressure (i.e., 101,325 Pa). Nonetheless, reference barometric pressure Pr is not limited to this specific value.

Parameter Fr represents the dynamic flying height (first dynamic flying height) that the head 121 has while the HDD remains under the reference barometric pressure Pr and the heater controller 153 is supplying no power to the heater 122. (This state shall be referred to as "specific state.") Hereinafter, parameter Fr will be called "dynamic flying height Fr." In this embodiment, the F calculation module 241 measures the dynamic flying height Fr is measured during the manufacture of the HDD (more precisely, during the heat run test).

The RAM 260 is a volatile memory in which data can be rewritten. A part of the storage area of the RAM 260 is used as write buffer for temporarily store the data (write data) to be written in the disk 110 via the HDC 240. Another part of the storage area of the RAM 260 is used as read buffer for temporarily store the data (read data) read from the disk 110 via the read/write channel 230. Still another part of the storage area of the RAM 260 is used as register file 261. The register file 261 includes registers 261a to 261d. The registers 261a, 261b and 261c are used to hold coefficient k, reference barometric pressure Pr and dynamic flying height Fr, respectively. The register 261d is used to hold a DFH power value (DFHPc) optimal at present for the target dynamic flying height Ft of the head 121.

The CPU 270 is the main control module of the HDD. The CPU 270 controls some other components of the HDD in accordance with the control program stored in the FROM 250.

In this embodiment, a flying-height measurement module (F measurement module) 280 is provided, extending over the read/write channel 230 and HDC 240, to measure the dynamic flying height of the head 121. The F measurement module 280 comprises the HS module 231 and the F calculation module 241. The HS module 231 and F calculation module 241 are incorporated in the read/write channel 230 and HDC 240, respectively.

Figure 2:
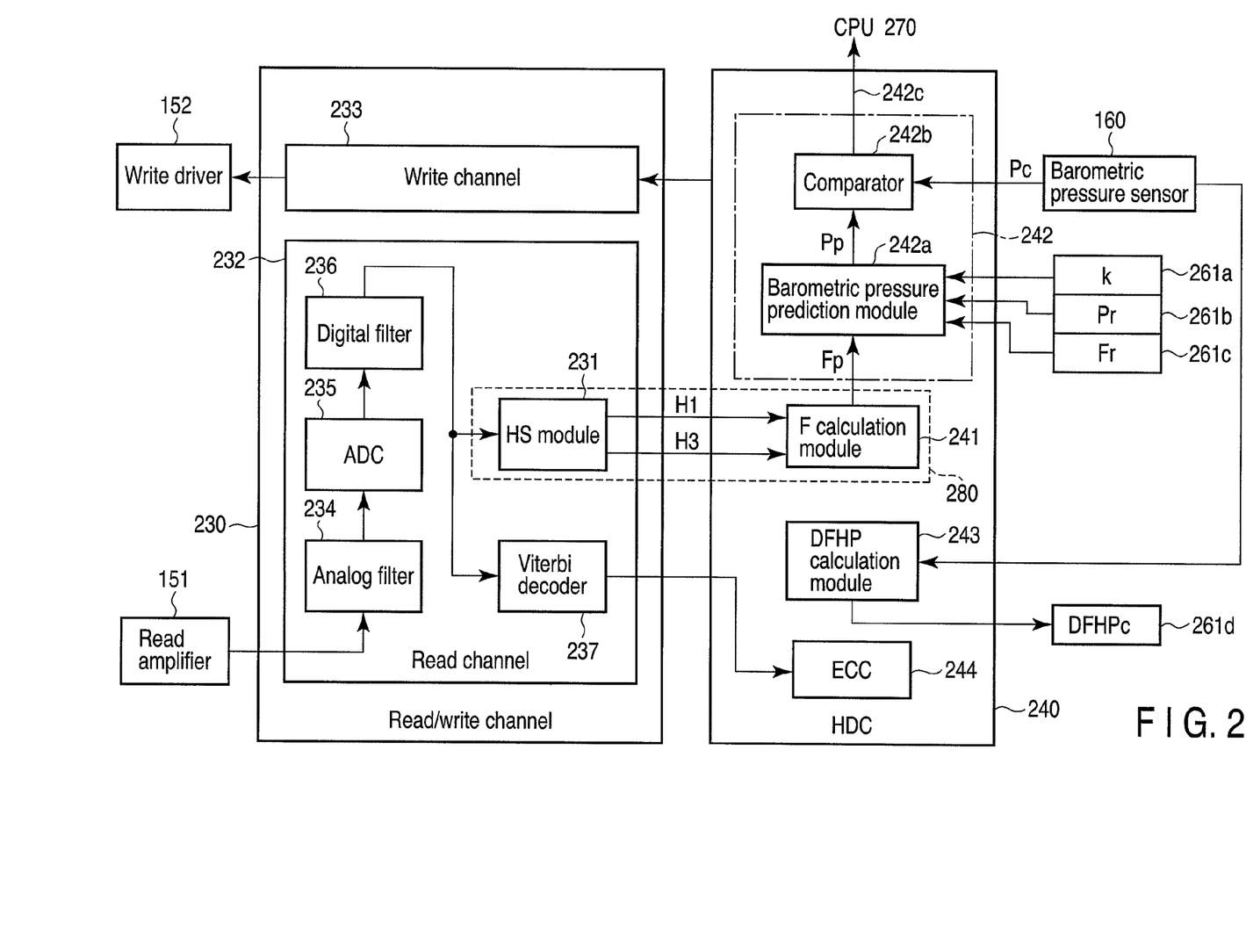
FIG. 2 is a block diagram showing exemplary configurations which the flying-height measurement module (F measurement module), failure detector and peripheral components, all illustrated in FIG. 1, may have.

FIG. 2 is a block diagram showing exemplary configurations which the F measurement module 280, the sensor failure detector 242), and the components peripheral to the module 280 and the detector 242, may have. The read/write channel 230 includes a read channel 232 and a write channel 233. The read channel 232 has a known circuit configuration that can process any read signal read by the head 121 and amplified by the read amplifier 151. More specifically, the read channel 232 includes an analog filter 234, an analog-to-digital converter (ADC) 235, a digital filter 236, and a viterbi decoder 237.

The analog filter 234 is used to remove high-frequency noise from the read signal amplified by the read amplifier 151. The ADC 235 converts the signal (i.e., read signal) output from the analog filter 234 to digital data, which is input to the digital filter 236. The digital filter 236 performs waveform equalization on the data output from the ADC 235. This waveform equalization (PR equalization) is adapted to data of the partial-response (PR) class. From the output of the digital filter 236, the viterbi decoder 237 detects the data item of the highest likelihood (i.e., most reliable data) and decodes the data item and generates data such as a non-return-to-zero (NRZ) code.

The read channel 232 includes an HS module 231. The HS module 231 detects, from the output of, for example, the digital filter 236, the amplitude H1 of a first harmonic wave and the amplitude H3 of a third harmonic wave, which are indispensable to the measurement of the dynamic flying height of the head 121.

The HDC 240 has the F calculation module 241, detector 242 and DFH calculation module 243, as has been described. The F calculation module 241 calculates the dynamic flying height of the head 121 from the amplitudes H1 and H3 of the first and third harmonic waves the HS module 231 has detected. As pointed out above, the HS module 231 and F calculation module 241 constitute the F measurement module 280.

The sensor failure detector 242 is configured to detect a failure of the barometric pressure sensor 160. The sensor failure sensor 242 includes a barometric pressure prediction module 242a and a comparator 242b. The barometric pressure prediction module 242a predicts the barometric pressure Pp at any time, from the dynamic flying height (second dynamic flying height) Fp of the head 121 measured by the F measurement module 280 (more precisely, by the F calculation module 241). To be more specific, the barometric pressure prediction module 242a predicts the barometric pressure Pp at the time the dynamic flying height has value Fp, from the coefficient k, reference barometric pressure Pr and dynamic flying height Ff held in the registers 261a, 261b and 261c, respectively.

The comparator 242b compares the absolute value |Pc−Pc| of the difference between barometric pressures Pp and Pc, with a predetermined threshold value Pth. Barometric pressure Pp has been predicted by the barometric pressure prediction module 242a. Barometric pressure Pc is the value that the barometric pressure sensor 160 detects when the comparator 242b compares the absolute value |Pc−Pc| with the threshold value Pth. If the absolute value |Pc−Pc| is greater than the threshold value Pth, the comparator 242b generates a signal (e.g., high-level signal) 242c, which indicates that the barometric pressure sensor 160 has failed to operate well. The signal 242c is transferred to the CPU 270.

From the barometric pressure detected by the barometric pressure sensor 160, the DFH calculation module 243 calculates a parameter value DFHPc optimal at the barometric pressure detected, for adjusting (setting) the dynamic flying height of the head 121 to the target dynamic flying height Ft. The parameter value DFHPc represents the DFH power to be supplied to the heater 122. In the aforementioned specific state, the higher the barometric pressure, the greater the dynamic flying height the head 121 will have; and conversely, the lower the barometric pressure, the smaller the dynamic flying height of the head 121.

Therefore, the higher the barometric pressure detected by the barometric pressure sensor 160, the greater parameter value DFHPc the DFH calculation module 243 calculates, so that the dynamic flying height of the head 121 may decrease to the target dynamic flying height Ft. Conversely, the lower the barometric pressure detected by the barometric pressure sensor 160, the smaller parameter value DFHPc the DFH calculation module 243 calculates. The parameter value DFHPc calculated by the DFH calculation module 243 is held in the register 261d. The CPU 270 serves as power controller and sets DFHPc (held in the register 261d) in the dedicated register incorporated in the HIC 150, through the HDC 240. Thus, the CPU 270 instructs the heater controller 153 to supply DFH power to the heater 122. So instructed, the heater controller 153 supplies to the heater 122 the DFH power represented by the parameter value DFHPc set in the dedicated register, i.e., DFH power optimal for the present barometric pressure. The dynamic flying height of the head 121 is thereby maintained at the target value Ft.

The HDC 240 further includes an error correction circuit (ECC) 244. The ECC 244 corrects the error in the data generated by the viterbi decoder 237 incorporated in the read channel 232, on the basis of the error correction code that is added to the data.

How this embodiment operates (A) to acquire coefficient k, (B) to acquire the dynamic flying height Fr and (C) to predict an abnormal state at the activation of the HDD will be explained below.

(A) Process of Acquiring Coefficient k

First, how the embodiment acquires coefficient k will be explained. In this embodiment, the dynamic flying heights F the heads 121 of different lots may have are measured during the manufacture of HDDs, while changing the barometric pressure P to various values under which the HDDs may be used. To measure the dynamic flying heights F, the F measurement module 280 (more precisely, F calculation module 241) is utilized. At this point, no power (no DFH power) is supplied to the heater 122 from the heater controller 153. How the F measurement module 280 (more precisely, F calculation module 241) measures the dynamic flying height of the head 121 will be explained later in detail.

Figure 3:
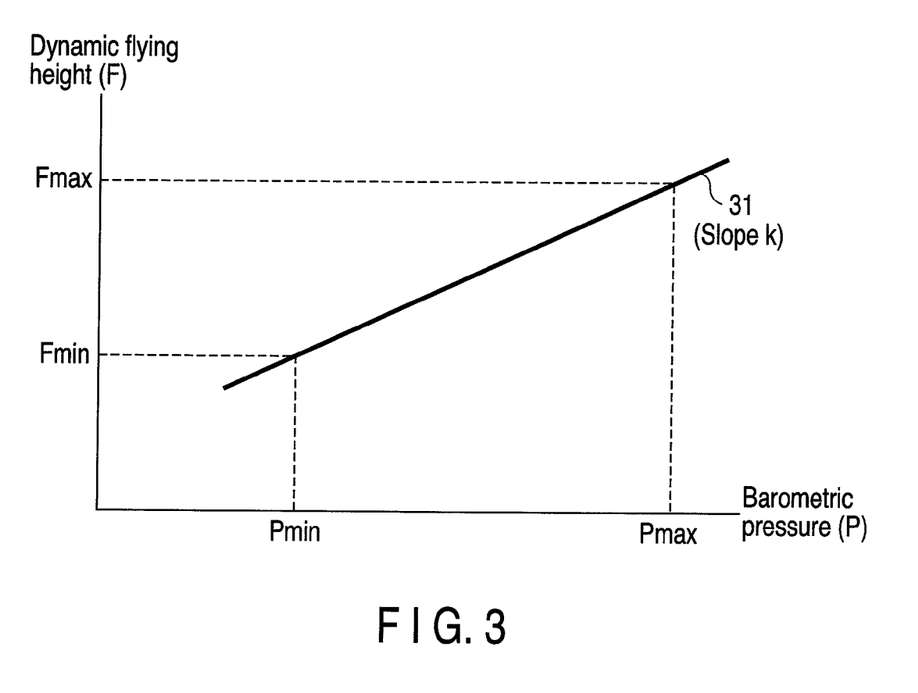
FIG. 3 is a graph representing a relation the dynamic flying height of the head may have with the barometric pressure while no DFH power is being supplied to the heater.

FIG. 3 is a graph representing a relation the dynamic flying height F of the head 121 may have with the barometric pressure P while no DFH power is being supplied to the heater 122 (that is, in the specific state). As evident from FIG. 3 and as known in the art, the relation the dynamic flying height F of the head has with the barometric pressure P is approximately defined by a straight line 31.

Hence, in this embodiment, minimum dynamic flying height Fmin and maximum dynamic flying height Fmax are measured, respectively, at the lower limit Pmin and upper limit Pmax of the pressure range in which the HDD can operate well as guaranteed. Then, coefficient k is acquired, which is the ratio of the difference between Fmax and Fmin (i.e., change in dynamic flying height) to the difference between Pmax and Pmin (i.e., change in barometric pressure), as expressed by the following equation:

$$k=(Fmax-Fmin)/(Pmax-Pmin) \quad (2)$$

This coefficient k is the slope of the straight line 31 shown in FIG. 3. Coefficient k thus acquired is saved in a specific storage location in the pressure-prediction parameter storage area 251 provided in the FROM 250. In this embodiment, coefficient k, thus acquired, can be applied in HDDs of the same type. Nonetheless, different coefficients k may be acquired for these HDDs, respectively.

(B) Process of Acquiring Dynamic Flying Height Fr

Figure 4:
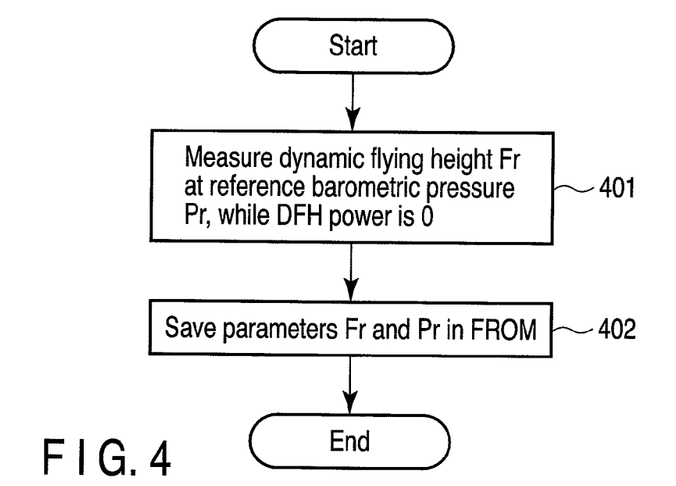
FIG. 4 is a flowchart explaining an exemplary sequence of acquiring the dynamic flying height of the head in the step of performing a heat run test on the HDD.

Now, how the embodiment acquires the dynamic flying height Fr will be explained with reference to the flowchart of FIG. 4. This process is performed in the heat run test during the manufacture of the HDD shown in FIG. 1, at the reference barometric pressure Pr and in the above-mentioned specific state. Here, assume that the data of a constant frequency (single-frequency reference pattern) for measuring the dynamic flying height has been written in a predetermined track (specified track) in the system area 111 provided in the disk 110.

The CPU 270 causes the F measurement module 280 to measure the dynamic flying height Fr of the head 121 at the reference barometric pressure Pr, while the heater controller 153 is supplying no DFH power to the heater 122 (Block 401). The dynamic flying height Fr is measured by the harmonic ratio flying height (HRF) method known in the art.

First, the head 121 reads the data of the constant frequency from the specified track, generating a read signal. The read signal (read-back signal) thus read by the head 121 is supplied to the read amplifier 151 incorporated in the HIC 150. The read amplifier 151 amplifies the read signal, which is input to the read channel 232 provided in the read/write channel 230. The read signal is then input via the analog filter 234 to the ADC 235. The ADC 235 converts the read signal to digital data. The digital data is supplied to the digital filter 236 and waveform-equalized. In the F measurement module 280, the HS module 231 detects the amplitude H1 of the first harmonic wave and the amplitude H3 of the third harmonic wave, from the digital data thus waveform-equalized. The HS module 231 may detect the amplitudes H1 and H3 from the digital data not waveform-equalized (i.e., the output of the ADC 235), instead of from the digital data waveform-equalized.

The F calculation module 241 provided in the F measurement module 280, calculates the dynamic flying height Fr of the head 121, from the amplitude H1 of the first harmonic wave and the amplitude H3 of the third harmonic, both detected by the HS module 231, using the HRF method. To calculate the dynamic flying height Fr, the F calculation module 241 uses a predetermined function f(x). Variable x is the natural logarithmic value ln (H1/H3) of ratio H1/H3 of the amplitude H1 of the first harmonic wave to the amplitude H3 of the third harmonic wave. That is, the F calculation module 241 calculates the dynamic flying height Fr of the head 121 by means of the following equation:

$$Fr=f\{ln(H1/H3)\} \quad (3)$$

The CPU 270 saves the dynamic flying height Fr calculated by the F calculation module 241 (provided in the F measurement module 280), along with the reference barometric pressure Pr, in the specific storage location in the pressure-prediction parameter storage area 251 provided in the FROM 250 (Block 402).

(C) Process of Predicting an Abnormal State

Figure 5:
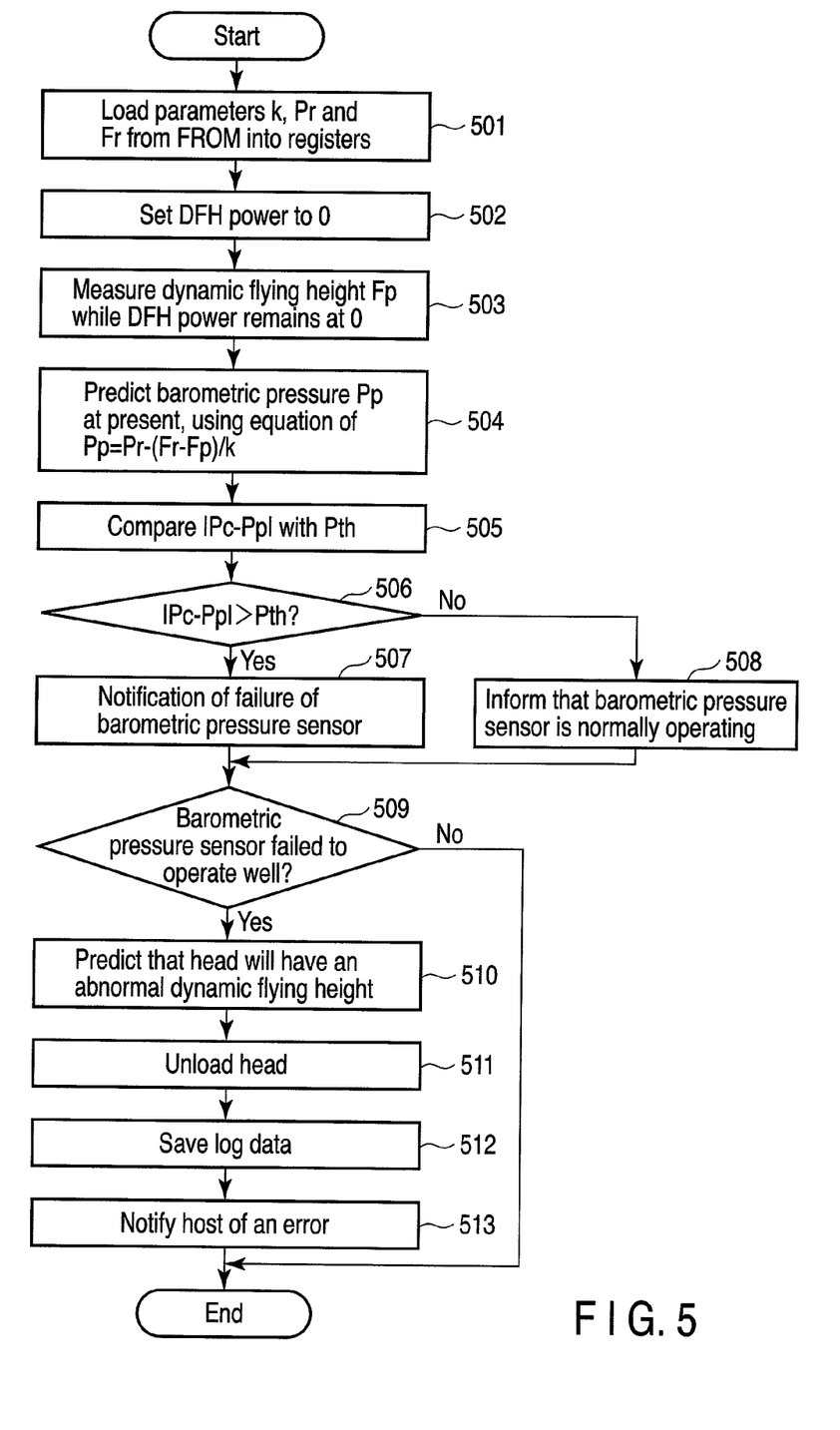
FIG. 5 is a flowchart explaining an exemplary sequence of predicting an abnormal dynamic flying height, at the time of activating the HDD.

The process of predicting an abnormal state of the dynamic flying height (abnormal state predicting process), which is performed when the HDD is activated (powered on), will be explained with reference to the flowchart of FIG. 5. When activated, the HDD is initialized. The initialization process includes the abnormal state predicting process performed under the control of the CPU 270.

First, the CPU 270 initializes the register file 261 provided in the RAM 260. At this point, the CPU 270 loads parameters k, Pr and Fr held in the pressure-prediction parameter storage area 251 provided in the FROM 250 into the registers 261a, 261b and 261c of the register file 261, respectively (Block 501). In Block 501, the CPU 270 sets "DFPc" in the register 261d of the register file 261. "DFPc" represents DFH power "0" (DFH power=0).

Next, the CPU 270 sets "DFHPc" held in the register 261d of the register file 261 and representing DFH power "0," in the dedicated register that is incorporated in the HIC 150 (Block 502). The DFH power the heater controller 153 supplies to the heater 122 is thereby set to "0." That is, the heater 122 of the HDD is no longer supplied with DFH power from the heater controller 153. In this state, the CPU 270 causes the F measurement module 280 to measure the dynamic flying height Fp that the head 121 has in the specific state (no DFH power being supplied to the heater 122), in the same way as in the process of measuring the dynamic flying height Fr (Block 503).

The barometric pressure prediction module 242a of the sensor failure sensor 242 receives the dynamic flying height Fp measured by the F measurement module 280 and also the parameters k, Pr and Fr now loaded (held) in the registers 261a, 261b and 261c. From the parameters k, Pr and Fr input to it, the barometric pressure prediction module 242a predicts the barometric pressure Pp in the environment in which the HDD is used by means of the following equation (Block 504):

$$Pp = Pr - (Fr - Fp)/k \quad (4)$$

In other words, the sensor failure sensor 242 uses equation 4, calculating the barometric pressure Pp predicted for the environment in which the HDD is located at present.

Figure 6:
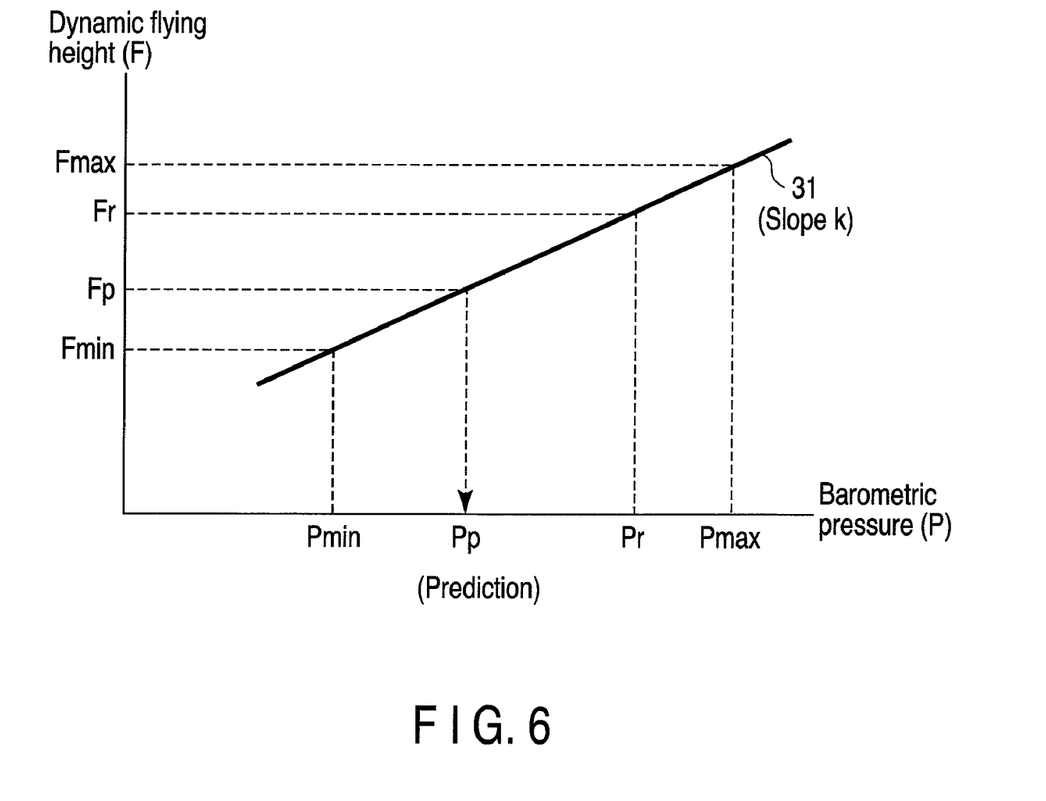
FIG. 6 is a graph explaining the principle of predicting the barometric pressure by means of a barometric pressure prediction module.

FIG. 6 is a graph explaining the principle of predicting the barometric pressure by means of a barometric pressure prediction module 242a in accordance with equation 4. More precisely, FIG. 6 shows the relation the dynamic flying height F has with the barometric pressure P. In FIG. 6, the slope (coefficient) k of line 31 indicates this relation. The slope (coefficient) k is given as follows:

$$k = (Fr - Fp)/(Pr - Pp) \quad (5)$$

where Pr and Pp are barometric pressures, and Fr and Fp are dynamic flying heights under the barometric pressures Pr and Pp.

As evident from equation 5, pressure (predicted pressure) Pp is expressed by equation 4.

The value of the barometric pressure Pp (i.e., predicted barometric pressure) predicted (calculated) by the barometric pressure prediction module 242a is input to the comparator 242b of the sensor failure sensor 242. Also input to the comparator 242b is the value of the present barometric pressure Pc (measured pressure) detected by the barometric pressure sensor 160. The comparator 242b compares the absolute value |Pc−Pp| of the difference between the measured barometric pressure Pc and the predicted barometric pressure Pp, with the predetermined threshold value Pth (Block 505).

The value |Pc−Pp| may surpass the threshold value Pth (YES in Block 506). That is, the deviation of the measured barometric pressure Pc from the predicted barometric pressure Pp may surpass the threshold value Pth. If this is the case, the comparator 242b outputs, for example, a high-level signal 242c to the CPU 270 (Block 507). The high-level signal 242c indicates failure of the barometric pressure sensor 160. On the other hand, the value |Pc−Pp| may be equal to or smaller than the threshold value Pth (NO in Block 506). That is, the deviation of the measured barometric pressure Pc from the predicted barometric pressure Pp may be equal to or may fall below the threshold value Pth. In this case, the comparator 242b outputs, for example, a low-level signal 242c to the CPU 270 (Block 508). The low-level signal 242c indicates that the barometric pressure sensor 160 is normally operating.

From the level (high or low) of the signal 242c output from the comparator 242b, the CPU 270 determines whether the barometric pressure sensor 160 has failed to operate well (Block 509). If the sensor 160 is found to have failed to operate well (if YES in Block 509), the CPU 270 predicts that the head 121 will have an abnormal dynamic flying height (Block 510). To be more specific, the CPU 270 first assumes that the DFH calculation module 243 calculates the value of the DFH power to supply to the heater 122, from the barometric pressure detected by the barometric pressure sensor 160 that has been found not to operate well. If the heater controller 153 supplies the DFH power, thus calculated, to the heater 122, the CPU 270 predicts that the dynamic flying height of the head 121 will greatly deviate from the target dynamic flying height Ft.

Assume that the barometric pressure detected by the barometric pressure sensor 160 that has been found not to operate well deviates in the increasing direction from the actual value, and the deviation is greater than the threshold value Pth. Then, if the HDD is driven in normal manner in this state, DFH power larger than the DFH power optimal for maintaining the head 121 at the target dynamic height Ft will be supplied to the heater 122. In this case, the dynamic flying height of the head 121 will be far smaller than the target dynamic flying height Ft. If the dynamic flying height of the head 121 is too small, the head 121 will contact the disk 110, possibly failing to work or damaging the disk 110.

Now assume that the barometric pressure detected by the barometric pressure sensor 160 that has been found not to operate well deviates from the actual value, being lower than the threshold value Pth. If the HDD is driven in normal manner in this state, DFH power smaller than the DFH power optimal for maintaining the head 121 at the target dynamic height Ft will be supplied to the heater 122. In this case, the dynamic flying height of the head 121 will be far larger than the target dynamic flying height Ft. If the dynamic flying height of the head 121 is too large, the head 121 may no longer correctly write or read data in and from the disk 110.

Hence, in this embodiment, if the CPU 270 predicts in Block 510 that the head 121 will have an abnormal dynamic flying height, it functions as an unload controller, unloading the head 121 onto the ramp (not shown) arranged outside the disk 110 (Block 511). This prevents the head 121 from contacting the disk 110, and ultimately prevents the head 121 from malfunctioning or the disk 110 from being damaged. This also prevents the head 121 from erroneous data reading and writing in and from the disk 110. The head 121 can be unloaded onto the ramp, as the CPU 270 instructs the motor driver IC 210 to unload the head 121 in the manner known in the art. That is, the CPU 270 causes the motor driver IC 210 to control the VCM 143 of the actuator 140.

After unloading the head 121 (Block 511), the CPU 270 saves the log data indicating that the head 121 is at an abnormal dynamic flying height, in the predicted-abnormality history area provided in, for example, the FROM 250 (Block 512). The log data is read from the predicted-abnormality history area of the FROM 250 and transferred via the HDC 240 to the host when the host makes a request for the log data.

After saving the log data in the predicted-abnormality history area provided in the FROM 250 (Block 412), the CPU 270 notifies the host of an error through the HDC 240 (Block 513). Note that Blocks 512 and 513 may be performed in reverse order.

Even if the barometric pressure (measured barometric pressure) Pc detected by the barometric pressure sensor 160 is correct, the dynamic flying height Fp measured by the F measurement module 280 may deviate from the dynamic flying height corresponding to the measured barometric pressure Pc, due to an abnormal state of the slider 120, for example. If this happens, the barometric pressure (predicted barometric pressure) Rp the barometric pressure prediction module 242a has predicted (calculated) by means of equation 4 may deviate from the measured barometric pressure Pc, surpassing the threshold value Pth. If the absolute value of the difference between the measured barometric pressure Pc and the predicted barometric pressure Pp surpasses the threshold value Pth, though the measured barometric pressure Pc is correct, the barometric pressure sensor 160 will be found not to operate well.

Thus, in this embodiment, if the absolute value of the difference between the measured barometric pressure Pc surpasses the threshold value Pth (Block 506), the pressure sensor 160 will be found not to operate well (Block 507a) even if the absolute value of the difference surpasses the threshold value Pth for any reason such as the abnormal operation of the slider 120. Thus, in this embodiment, the above-mentioned specific state is regarded as resulting from failure of the pressure sensor 160, even if the specific state has resulted from any other cause. Nevertheless, this embodiment is free from such a problem as will be described below.

Assume that the sensor failure sensor 242 (more precisely, comparator 242b) notifies the CPU 270 of the fact that the pressure sensor 160 has failed to operate well, upon detecting the above-mentioned specific state (Block 507). So notified, the CPU 270 predicts that the head 121 may have an abnormal dynamic flying height (Blocks 509 and 510). Then, the CPU 270 unloads the head 121 onto the ramp (Block 511).

Assume that the specific state has resulted not from failure of the pressure sensor 160, but from a trouble with, for example, an abnormal operation of the slider 120. Also assume that the head 121 cannot be unloaded, despite the specific state detected. Then, the dynamic flying height of the head 121 will greatly deviate from the target dynamic flying height Ft if the heater 122 receives the DHF power corresponding to the barometric pressure Pc detected by the pressure sensor 160, though the barometric pressure Pc (measured barometric pressure) is correct. In the worst case, the head 121 may contact the disk 110, inevitably malfunctioning or damaging the disk 110.

Nonetheless, in this embodiment, the sensor failure sensor 242 detects failure of the pressure sensor 160 if the specific state is detected (Block 506), irrespective of the real cause of the failure (Block 507). In this case, the CPU 270 predicts an abnormal dynamic flying height (Blocks 509 and 510), and the head 121 is unloaded (Block 511). Thus, even if the specific state has resulted from any cause other than the failure of the pressure sensor 160, the head 121 will be prevented from malfunctioning or the disk 110 will be prevented from being damaged.

In the embodiment described above, the HRF method is performed to measure the dynamic flying height. Nonetheless, any other methods known in the art may be utilized to measure the dynamic flying height. For example, the pulse-width method may be employed. Moreover, the actuator 140 may be a piezoelectric actuator or an electrostatic actuator, not the thermal actuator described above.

At least one of the components of the HDC 240, i.e., the F calculation module 241, barometric pressure prediction module 242a, comparator 242b and DFH calculation module 243, may not be used. In this case, the CPU 270 can perform the process assigned to that component.

The various modules of the disk drive described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A magnetic disk drive comprising:
a barometric pressure sensor configured to detect a barometric pressure of an environment in which the magnetic disk drive is used;
a power controller configured to make an instruction to supply power to a flight height adjusting device, based on the barometric pressure detected by the barometric pressure sensor, the flight height adjusting device configured to adjust a dynamic flying height of a head in accordance with power supply;
a failure detection module configured to detect failure of the barometric pressure sensor; and
an unload controller configured to predict an abnormal dynamic flying height of the head based on detection of the failure of the barometric pressure sensor and to instruct unloading of the head from the disk.

2. The magnetic disk drive of claim 1, further comprising a flight height measurement module configured to measure the dynamic flying height of the head,
wherein the failure detection module comprises a barometric pressure prediction module configured to predict a barometric pressure ($P_p$) in the environment from the dynamic flying height of the head, measured by the flight height measurement module in a state where no power is supplied to the flight height adjusting device; and
the failure detection module is configured to detect the failure of the barometric pressure sensor from a difference between a barometric pressure ($P_c$) detected by the barometric pressure sensor and the barometric pressure $P_p$ predicted by the barometric pressure prediction module when the barometric pressure $P_c$ is detected.

3. The magnetic disk drive of claim 2, wherein the barometric pressure prediction module is configured to predict the barometric pressure $P_p$ from a coefficient k representing a ratio of a change in the dynamic flying height of the head to a change in the barometric pressure in the environment where the magnetic disk drive is used, and a first dynamic flying height ($F_r$) of the head as a dynamic flying height of the head measured by the flight height measurement module in a state where the magnetic disk drive is at a reference barometric pressure ($P_r$) and no power is supplied to the flight height adjusting device, the barometric pressure $P_p$ corresponding a second dynamic flying height ($F_p$) as the dynamic flying height of the head measured by the flight height measurement module in the state where no power is supplied to the flight height adjusting device.

4. The magnetic disk drive of claim 3, wherein the barometric pressure prediction module is configured to calculate the barometric pressure $P_p$ in accordance with the following equation:

$$P_p = P_r - (F_r - F_p)/k.$$

5. The magnetic disk drive of claim 4, wherein the barometric pressure prediction module is configured to predict the barometric pressure Pp when the disk drive is activated.

6. The magnetic disk drive of claim 3, wherein the barometric pressure prediction module is configured to predict the barometric pressure Pp when the disk drive is activated.

7. The magnetic disk drive of claim 3, further comprising a nonvolatile memory configured to pre-store the coefficient k, the first dynamic flying height $F_r$ and the reference barometric pressure $P_r$.

8. The magnetic disk drive of claim 3, further comprising a nonvolatile memory configured to pre-store the coefficient k, the first dynamic flying height $F_r$, and the reference barometric pressure $P_r$.

9. The magnetic disk drive of claim 2, wherein the failure detection module further comprises a comparator configured to compare an absolute value of the difference with a predetermined threshold value and to generate a failure signal indicating failure of the barometric pressure sensor when the absolute value of the difference exceeds the threshold value.

10. The magnetic disk drive of claim 2, wherein the barometric pressure prediction module is configured to predict the barometric pressure $P_p$ when the disk drive is activated.

11. The magnetic disk drive of claim 1, wherein the unload controller is configured to notify an error to a host apparatus using the magnetic disk drive, upon predicting the abnormal dynamic flying height of the head.

12. The magnetic disk drive of claim 11, wherein the unload controller is configured to store a history of abnormal flying height prediction in a specific area of a nonvolatile memory, the history being read in response to a request made by the host apparatus.

13. A method of predicting an abnormal dynamic flying height of a head in a magnetic disk drive adjusted by supplying to an flight height adjusting device an electric power determined from a barometric pressure detected by a barometric pressure sensor, the method comprising:

detecting failure of the barometric pressure sensor;

predicting an abnormal dynamic flying height of the head from the failure of the barometric pressure sensor detected; and unloading the head from a disk when the abnormal dynamic flying height of the head is predicted.

14. The method of claim 13, further comprising:

measuring the dynamic flying height of the head in a state where no power is supplied to the flight height adjusting device; and predicting a barometric pressure ($P_p$) in an environment where the magnetic disk drive is used, from the dynamic flying height of the head measured in the specific state, wherein in the detecting, the failure of the barometric pressure sensor is detected from a difference between the barometric pressure $P_p$ and a barometric pressure ($P_c$) detected by the barometric pressure sensor when the barometric pressure Pp is predicted.

15. The method of claim 14, wherein in the predicting, the barometric pressure $P_p$ is predicted from a coefficient k representing a ratio of a change in the dynamic flying height of the head to a change in the barometric pressure in the environment where the disk drive is used, and a first dynamic flying height ($F_r$) of the head as a current dynamic flying height of the head in a state where the magnetic disk drive is at a reference barometric pressure ($P_r$) and no power is supplied to the flight height adjusting device, the barometric pressure $P_p$ corresponding a second dynamic flying height ($F_p$) as a current dynamic flight height of the head measured in the measuring.

* * * * *